United States Patent Office 3,130,767
Patented Apr. 28, 1964

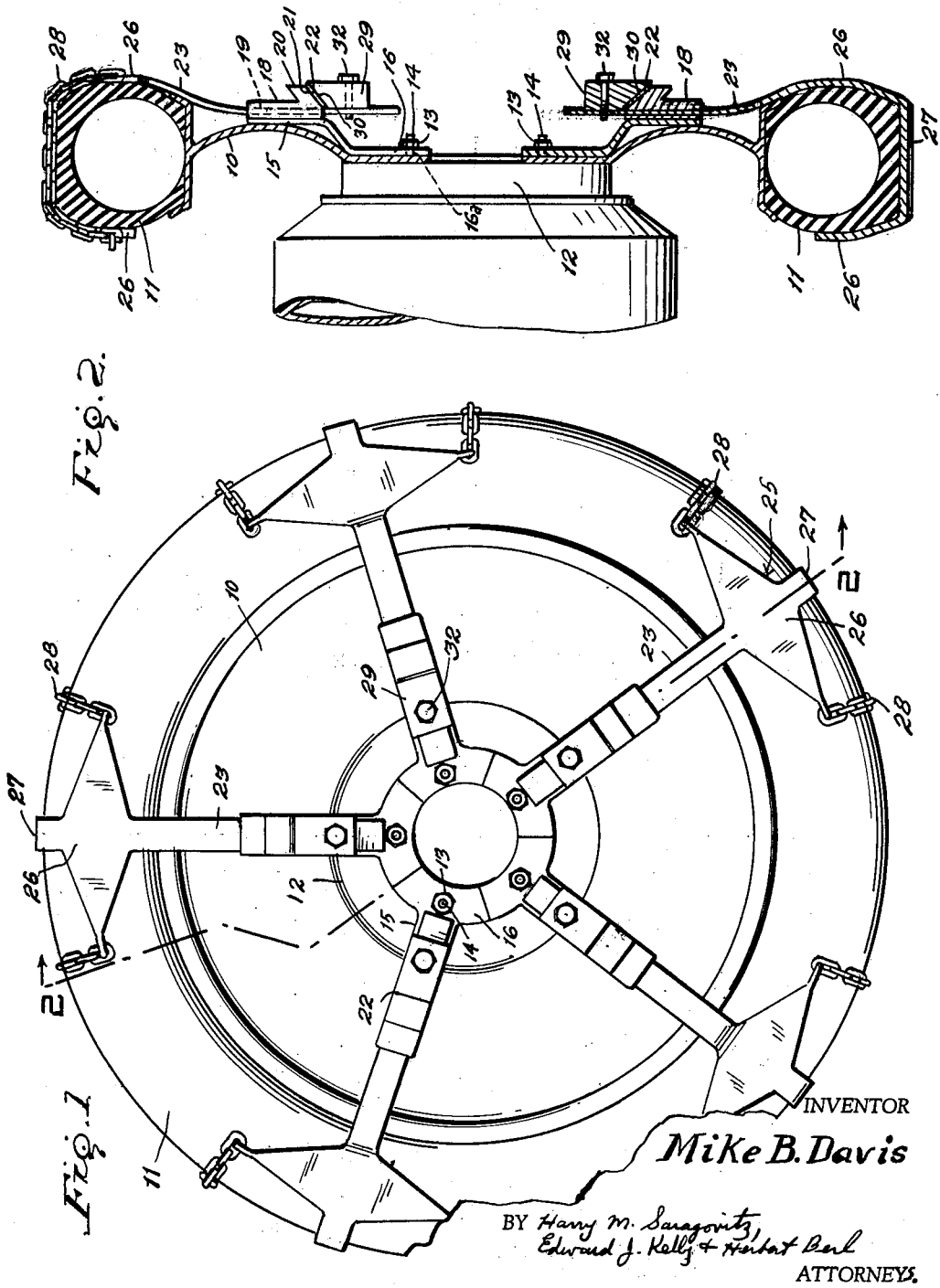

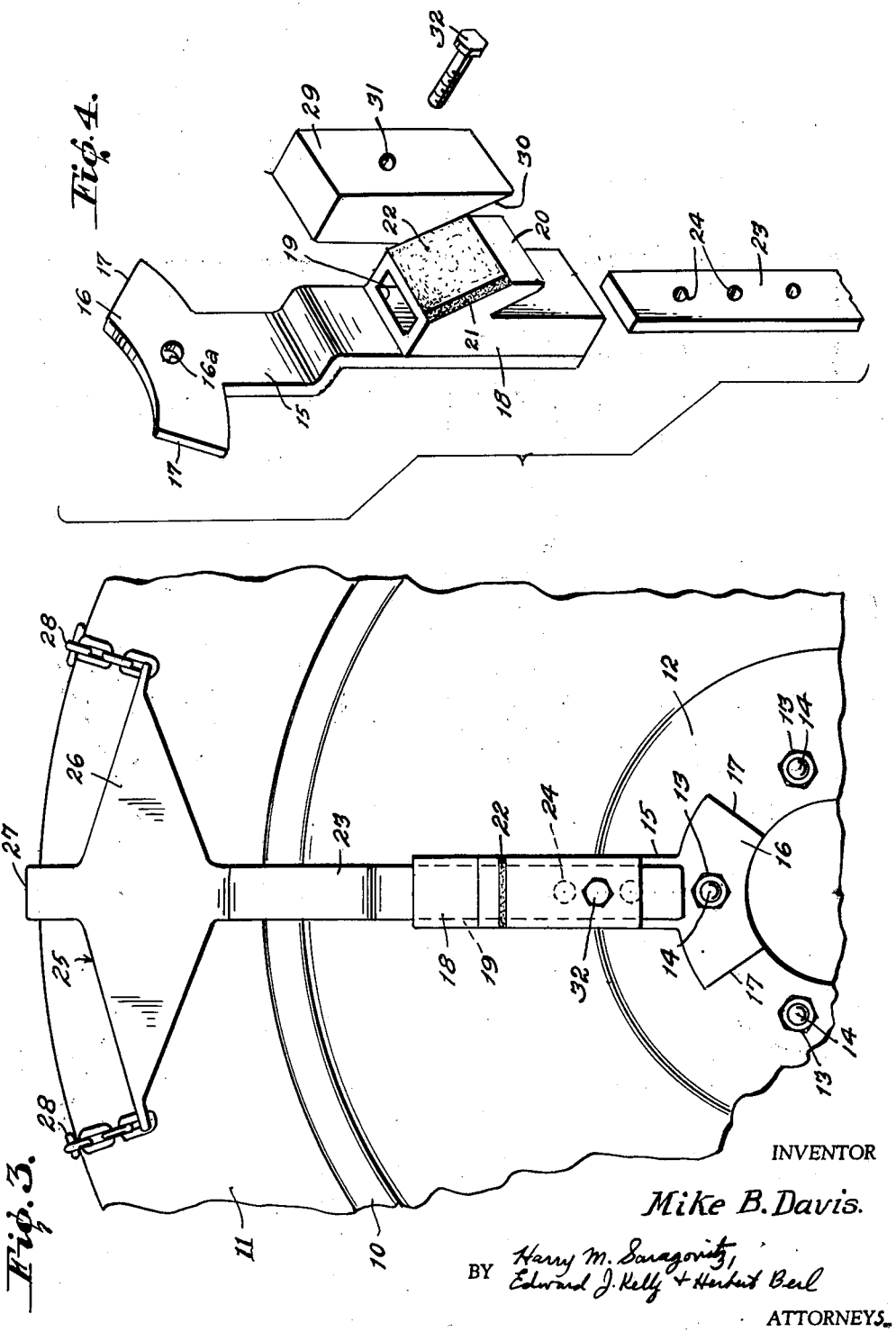

3,130,767
TRACTION AID FOR WHEELED VEHICLES
Mike B. Davis, 22 Shepherd Road, Malvern, Pa.
Filed May 13, 1963, Ser. No. 280,171
4 Claims. (Cl. 152—216)
(Granted under Title 35, U.S. Code (1952), sec. 266)

The invention described herein may be manufactured and used by or for the Government for governmental purposes without the payment to me of any royalty thereon.

My invention relates to a traction aid for wheeled vehicles, and more particularly to such a device that can be applied to a wheel of a vehicle without the necessity of jacking up the vehicle.

It is, therefore, a primary object of my invention to provide a traction aid for wheeled vehicles which can be applied to the wheel while same is mired in mud, sand, and/or snow without the necessity of jacking up the vehicle.

Another object of my invention is to provide individual traction aids for wheeled vehicles wherein one or more aids may be secured to a wheel by utilizing the conventional wheel nut and brake drum lug.

A further object of my invention is to provide individual traction aids for wheeled vehicles having arcuate head portions of a predetermined size adapted to be secured to a wheel by utilizing conventional wheel nuts and brake drum lugs in such a manner that the outer edges of one arcuate head abut the edge of the adjacent arcuate head so as to form a reinforcing ring of individual traction aids.

Still an additional object of my invention is to provide traction aids for wheeled vehicles wherein a guide member is secured to the hub of the wheel and a stirrup traction member is fastened in the guide member by means that when tightened will pull the stirrup traction member towards the center of the wheel.

Other objects and advantages of my invention will be apparent during the course of the following description.

In the accompanying drawing, forming a part of this application, and in which like numerals are employed to designate like parts throughout the same:

FIG. 1 is a side elevational view of my invention secured to the wheel and tire of a vehicle;

FIG. 2 is a cross-sectional view of a wheel and tire showing my invention mounted thereon;

FIG. 3 is an enlarged fragmentary view of an individual traction aid secured to the wheel and tire of a vehicle; and FIG. 4 is an exploded enlarged view showing the fastening means which secures the free end of the stirrup in the guide member.

In the drawing wherein for the purpose of illustration is shown a preferred embodiment of my invention, the numeral 10 indicates the wheel having a tire 11 mounted thereon. The wheel 10 is secured to the brake drum 12 by nuts 13 which are threaded on conventional drum carried lugs 14.

The stirrup guide plates 15 have enlarged arcuate head portions 16 with a brake drum lug receiving opening 16a therethrough and outer radial opposed edges 17. The plates 15 terminate in an offset portion providing a guide member 18 having a channel 19 therethrough and a rearwardly inclined projecting flange 20 with a flat surface 21 which is preferably covered with elastic material 22. A traction stirrup 23 is furnished for each stirrup guide plate 15 and has a series of threaded openings 24 in its free end and terminates in a U-shaped tire tread engaging hook 25 having enlarged leg portions 26 and a flat bight portion 27. Traction chains 28 engage the tire tread and are secured at opposite ends of the enlarged leg portions 27 by any suitable means.

A snug plate 29 has an inclined face 30 at one end thereof of a pitch substantially the same as that of the inclined surface 21 of the flange 20, and a hole 31 at the end opposite from said inclined face 30 adapted to receive a screw 32. The screw 32 has a head of a shape and size corresponding to the nut 13 so that the same tool may be used to tighten or loosen both the screw 32 and the nut 13.

In operation, a wheel nut 13 is removed from a drum carried lug 14 and a stirrup guide plate 15 is placed over the lug 14 by means of opening 16a against the wheel 10. The nut 13 is then replaced on the lug 14. If desired, the five stirrup guide plates 15 may be positioned at the onset of the winter or rainy season, or as heretofore mentioned, one or more of the plates 15 may be secured after the vehicle is mired in snow or mud. Even if the vehicle is mired up to the axle, at least two of the plates 15 can be positioned without moving the tire or clearing away the snow or mud.

After the stirrup guide plates 15 are positioned, the traction stirrups 23 can be utilized at any time by placing the hook 25 over the tread of the tire and inserting the free end through the channel 19 of the guide member 18.

The free end of the traction stirrup 23 is secured in the channel 19 of the guide 18 by means of the snug plate 29. The inclined surface 30 of the snug plate 29 engages the inclined surface 21 and the elastic material 22 of the guide member 18 and the screw 32 is placed through the hole 31 in the snug plate 29 and is threaded through one of the openings 24 in the free end of the stirrup 23. The screw 32 is tightened to force the two inclined surfaces 21, 30, together thereby pulling the traction stirrup 23 towards the center of the wheel causing the traction stirrup hook 25 and chains 28 to fit tightly against the tire tread.

It is to be understood that the form of the invention herewith shown and described is to be taken as a preferred embodiment of the same, and that various changes in the shape, size, and arrangement of parts may be resorted to without departing from the spirit of my invention or the scope of the subjoined claims.

I claim:

1. A traction aid for wheeled vehicles comprising a plate adapted to be secured to the hub of a wheel, a plurality of stirrup guide members each having a channel therethrough, an upwardly directed flange having an inclined face adjacent said channel portion, a plurality of traction stirrup members adapted to fit over the tread of a tire and having a free end extending through said channel, said free end providing a plurality of threaded openings therethrough, a snug plate having an opening therethrough selectively registering with the threaded openings in said free end of said traction stirrup and an inclined face of a pitch similar to that of the inclined face of said flange, and a screw extending through the opening in said snug plate and threaded into one of said threaded openings in said free end of said traction stirrup which when tightened forces the inclined faces of the snug plate and guide member together thereby pulling said traction stirrup against the tire tread.

2. A traction aid for wheeled vehicles comprising at least two stirrup guide plates adapted to be secured to the hub of a wheel and each having a channel extending through a portion thereof, a flange having an inclined face adjacent said channel, a plurality of traction stirrup members, each of said stirrup members adapted to fit over the tread of a tire and having a free end extending through said channel in one of said guide plates, said free end providing a plurality of threaded openings therethrough, a snug plate having an opening therethrough registering with any one of the threaded openings in said free end of said traction stirrup and an inclined face of a pitch similar to that of the inclined face of said flange, and means extending through the openings in the snug plate and in the free end of the traction stirrup to draw the inclined faces of the snug plate and guide member together thereby pulling said traction stirrup against the tire tread.

3. The combination with a wheeled vehicle having a wheel and tire mounted on a brake drum by the conventional lugs and nuts; of a traction aid device comprising a stirrup guide plate carried by each of said lugs, each of said plates providing an enlarged arcuate head portion of a size to abut the adjacent guide plate thereby forming a reinforcing ring, each head portion having an opening therethrough to receive one of the lugs, an offset portion having a channel through same and an inclined upwardly projecting flange, a plurality of traction stirrup members, each of said stirrup members having a hook tire-tread engaging portion and a free end extending through said channel in one of said guide plates, said free end providing a plurality of threaded openings therethrough, a snug plate having an opening therethrough registering with any one of the threaded openings in said free end of said traction stirrup and an inclined face of a pitch similar to that of the inclined projecting flange, and means extending through the openings in the snug plate and in the free end of the traction stirrup to draw the inclined portions of the snug plate and guide member together thereby pulling said traction stirrup against the tire tread.

4. A traction aid for wheeled vehicles comprising at least two stirrup guide plates adapted to be secured to the hub of a wheel and each having a channel extending through a portion thereof, a flange having an inclined face adjacent said channel, a plurality of traction stirrup members, a hook provided by said stirrup members adapted to fit over a portion of the tread of a tire, at least one chain link carried by said hook embracing the tire tread, said stirrup member having a free end extending through said channel, said free end providing a plurality of threaded openings therethrough, a snug plate having an opening therethrough registering with any one of the threaded openings in said free end of said traction stirrup and an inclined face of a pitch similar to that of the inclined face of said flange, and means extending through the openings in the snug plate and in the free end of the traction stirrup to draw the inclined faces of the snug plate and guide member together thereby pulling said traction stirrup against the tire tread.

References Cited in the file of this patent

UNITED STATES PATENTS

| | | |
|---|---|---|
| 2,503,399 | Maas | Apr. 11, 1950 |
| 2,598,851 | Spevak | June 3, 1952 |
| 3,093,180 | Jones | June 11, 1963 |